June 21, 1927.                    J. T. SHOUP                    1,632,804
                                   VEHICLE
                              Filed Dec. 11, 1925            4 Sheets-Sheet 3
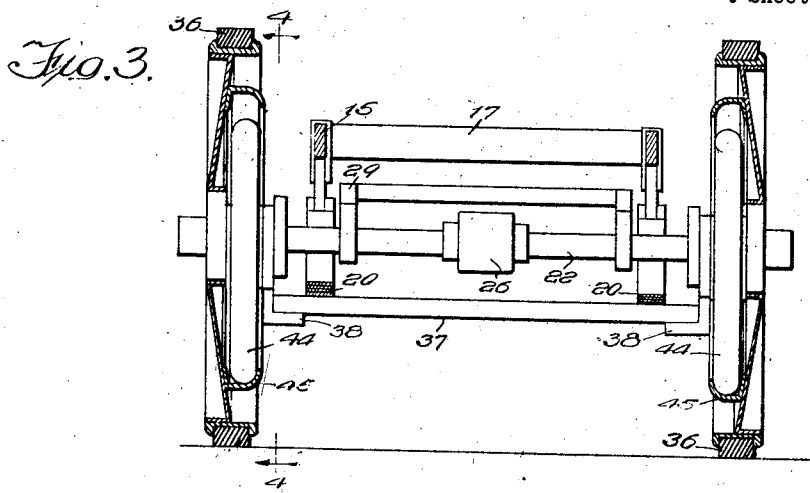
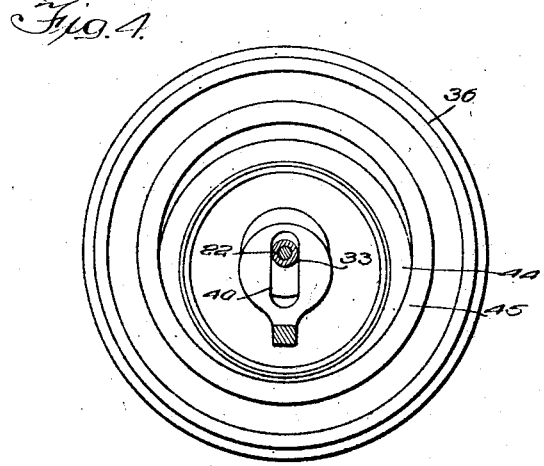
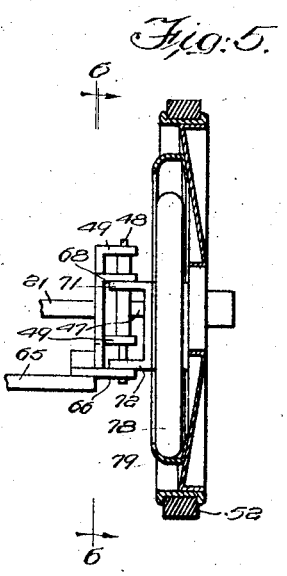
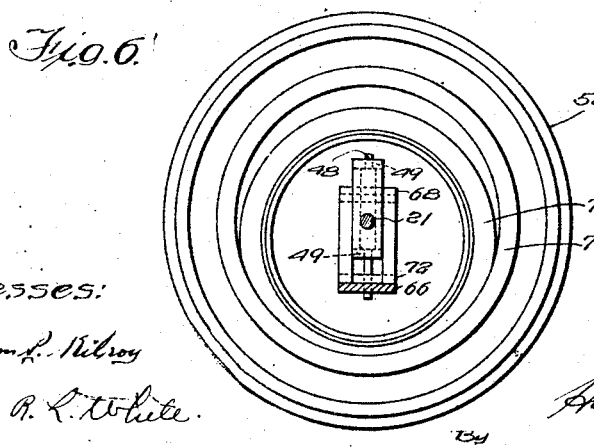
Witnesses:
William L. Kilroy
Harry R. L. White
Inventor:
James T. Shoup June 21, 1927.

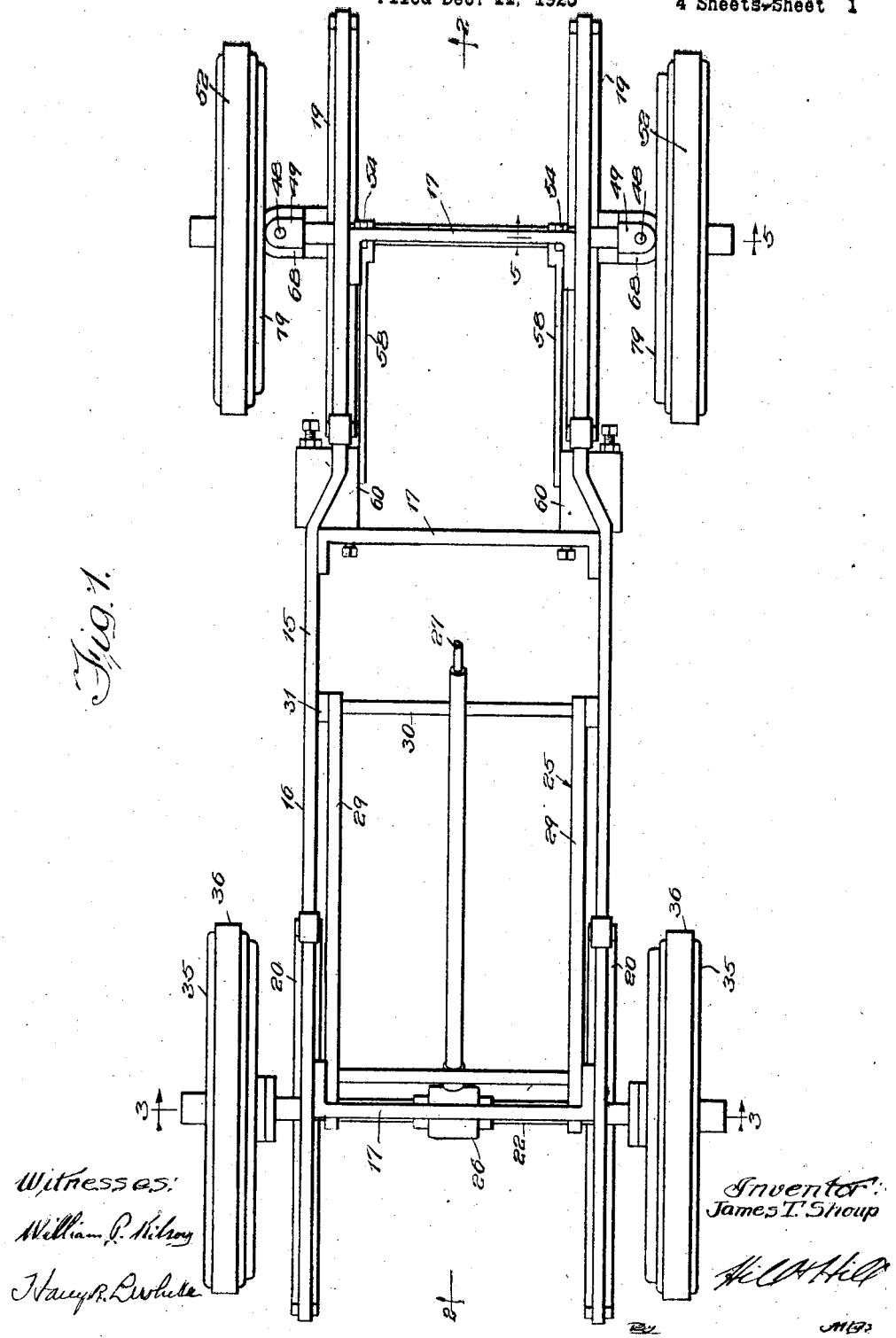

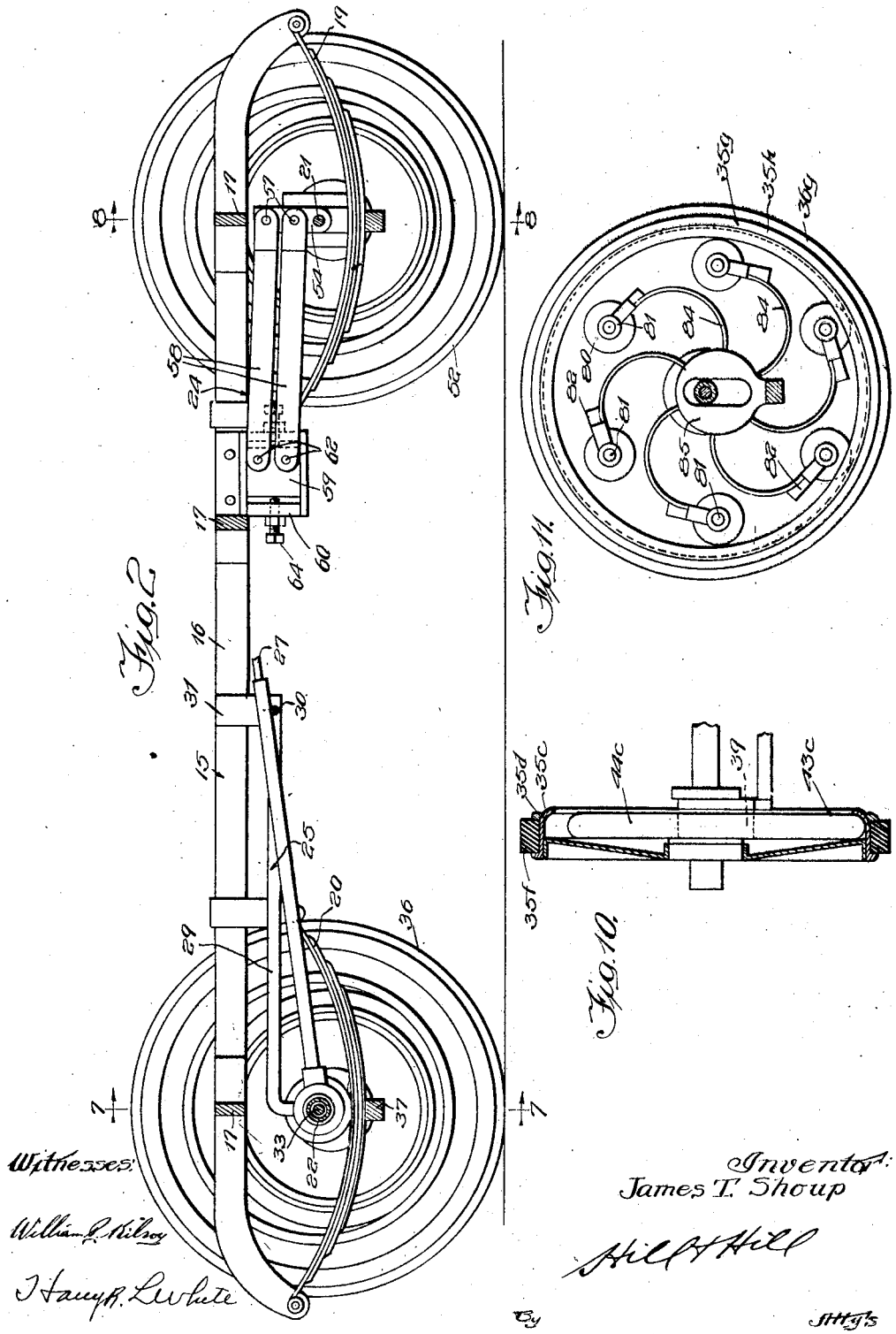

J. T. SHOUP 1,632,804

VEHICLE

Filed Dec. 11, 1925   4 Sheets-Sheet 4

Witnesses:
William P. Kilroy
Harry R. L. White

Inventor:
James T. Shoup

Patented June 21, 1927.

1,632,804

UNITED STATES PATENT OFFICE.

JAMES T. SHOUP, OF CHICAGO, ILLINOIS, ASSIGNOR TO METTIE R. SHOUP, OF CHICAGO, ILLINOIS.

VEHICLE.

Application filed December 11, 1925. Serial No. 74,782.

My invention relates to vehicles and particularly to running gear for vehicles.

The invention has among its other objects the production of running gear of the character described, which is convenient, durable, efficient and satisfactory for use wherever found applicable.

A particular object of the invention is to provide improved running gear for self-propelled vehicles.

Another particular object of the invention is to provide running gear comprising pneumatic tires, or the equivalent, which are subjected to a minimum of wear.

Another particular object of the invention is to provide improved running gear comprising resilient wheels which are not subject to punctures.

One form of the invention is embodied in an automobile chassis comprising a frame upon which the engine and body may be mounted and provided with front and rear wheels having solid resilient tires or their equivalent, the wheels being carried by auxiliary frames pivoted to the main frame and serving as tracks for pneumatically tired wheels which are mounted upon auxiliary axles carried by the usual springs provided at the front and rear ends of the main frame. The weight of the body and the engine is carried by the pneumatically tired wheels which absorb shocks and vibration and transmit the load to the wheels having solid tires, the pneumatically tired wheels being driven by the wheels having solid tires.

The above mentioned and other forms of the invention are fully described in the following detail description:

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings, wherein like reference characters indicate like or corresponding parts:

Fig. 1 is a plan view of an automobile chassis embodying the invention;

Fig. 2 is a section taken on line 2—2 of Fig. 1;

Fig. 3 is a section taken on line 3—3 of Fig. 1;

Fig. 4 is a section taken on line 4—4 of Fig. 3;

Fig. 5 is a section taken on line 5—5 of Fig. 1;

Fig. 6 is a section taken on line 6—6 of Fig. 5;

Fig. 10 is a fragmentary section corresponding to Fig. 3 and illustrating another form of the invention; and Fig. 11 is a section corresponding to Fig. 4 and illustrating still another form of the invention.

Figure 7:
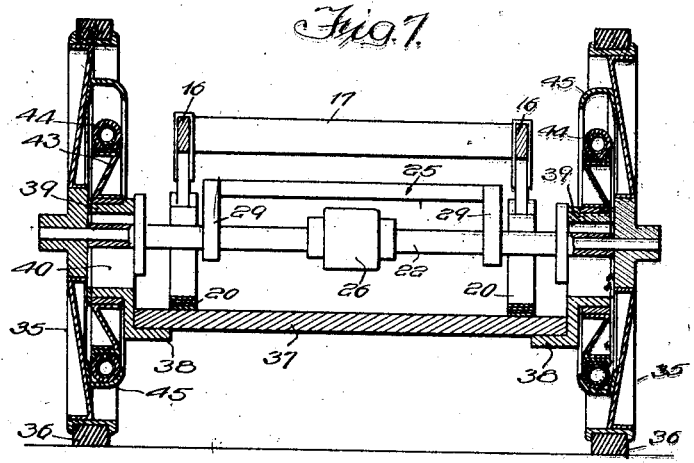
Fig. 7 is a section taken on line 7—7 of Fig. 2.

Referring for the present to Figs. 1 to 8, inclusive, wherein I have shown a preferred form of the invention embodied in an automobile chassis, the reference character 15 designates generally a frame resembling the frames commonly provided in automobile chassis to carry the bodies and engines, the frame preferably comprising side members 16 and a plurality of cross members 17. The frame 15 is provided with front and rear springs 19 and 20, respectively, which are secured to the frame by any suitable means. Mounted independently of the springs 19 and 20 are front and rear axles 21 and 22, respectively, which are carried by auxiliary frames 24 and 25, respectively. In this instance, the rear axle 22 includes the usual differential 26 operatively connected by a propeller shaft 27 and other suitable mechanism (not shown) to an internal combustion engine (not shown) mounted upon the frame 15.

The auxiliary frame 25 may comprise longitudinally arranged members 29 or the equivalent which have their forward ends pivoted upon a shaft 30 arranged transversely of the frame 15 and mounted in brackets 31 depending from the side members 16, the rear axle 22 being rigidly secured in or to the rear ends of the members 29. Rotatably journaled in the rear axle 22 and operatively connected to the differential 26 are the usual shafts 33 upon which the rear driving wheels are mounted, the rear driving wheels being identified in this instance by the reference character 35. It will be noted that the wheels 35 are provided with solid resilient tires 36, but I am not limited to this construction, for, in some instances, I may dispense with resilient tires and may permit the metallic or wooden rims of the wheels 35 to engage the ground.

Carried by the rear springs 20 is an auxiliary rear axle 37 having bracket members 38 rigidly secured to the ends thereof, each bracket member 38 being preferably formed with a hub 39 which is slotted as at 40 to accommodate the rear axle 22. Rotatably journaled upon the hubs 39 are wheels 43 having pneumatic tires 44 adapted to ride upon annular tracks 45 carried by the wheels 35. The annular tracks 45 are of relatively small diameters when compared with the outside diameters of the wheels 35. This permits relatively small pneumatic tires 44 to be employed and thus lessens the cost of the improved running gear.

In the embodiment of the invention illustrated in Figs. 1 to 8, inclusive, the rear axle 22 is not slidably journaled in the slots 40 of the hubs 39, the movements of the rear axle being in an arc which has the longitudinal axis of the shaft 30 as its center. However, in some embodiments of the invention I may prefer to provide arcuate slots 40 in which the rear axle 22 may be slidably journaled, and, in other embodiments of the invention, I may prefer to journal the axle 22 in bearing blocks which are in turn slidably journaled in the slots 40.

Figure 8:
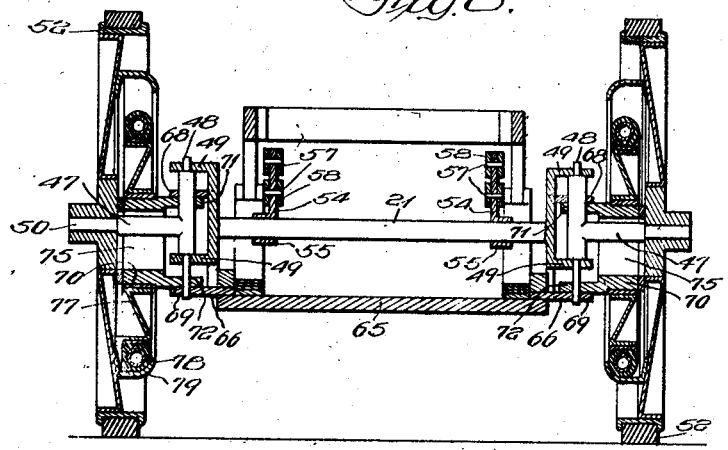
Fig. 8 is a section taken on line 8—8 of Fig. 2.

As best shown in Fig. 8, steering knuckles 47 are pivoted to the ends of the front axle 21 by knuckle pins 48, the axle 21 being preferably bifurcated as at 49 to accommodate the steering knuckles. Each steering knuckle 47 preferably comprises a spindle 50 or the equivalent upon which a wheel 52 is rotatably journaled, the wheels 52 being preferably of the same diameter as the wheels 35 and being similarly constructed. As hereinbefore set forth, the axle 21 is mounted in an auxiliary frame 24 which preferably comprises brackets 54 having hubs 55 in which the axle 21 is rigidly secured. Pivoted to each bracket 54 by pins 57 are links 58 which operatively connect the bracket with a slide 59 journaled in a bracket 60 rigidly secured to the frame 15, pins 62 being provided for pivotally connecting the links 58 to the slide 59. It will be noted that each bracket 54 and the links 58 and the slide 59 associated with it constitute a parallel link motion, the axle 21 being movable toward and away from the frame 15. I preferably provide set screws 64 or the equivalent in the brackets 60 to serve as stops for the slides 59. The purpose of this construction will presently appear.

Carried by the front springs 19 is an auxiliary front axle 65 to the ends of which brackets 66 are rigidly secured, each bracket 66 preferably comprising bifurcations 68 and 69. As illustrated, the bifurcations 68 rotatably journal the steering knuckles 47 and the bifurcations 69 rotatably journal the lower end of the knuckle pins 48. The aforementioned bifurcated ends 49 of the axle 21 are preferably slidably journaled in the brackets 66, the construction being such that the axle 21 and the auxiliary axle 65 may move relative to each other. Associated with each bracket 66 is a hub 70 having bifurcations 71 and 72 inserted between the bifurcations 68 and 69 of the bracket, the bifurcations 71 and 72 being rotatably journaled upon the steering knuckle 47 and the knuckle pin 48, respectively. Slots 75 provided in the hubs 70 accommodate the spindles 50 of the steering knuckles 47.

Rotatably journaled upon the hubs 70 are wheels 77 having pneumatic tires 78 adapted to ride upon annular tracks 79 carried by the wheels 52. It will be noted that the pneumatic tires 78 correspond in size to the aforementioned pneumatic tires 44 and that the wheels 52 are substantially of the same diameter as the aforementioned wheels 35.

The combined weight of the frame 15 and the body (not shown) and the engine (not shown) is carried by the wheels 43 and 77. The pneumatic tires 44 and 78 carried by these wheels function to absorb shocks and vibration when the vehicle is in motion and it is readily understood that while the pneumatic tires 44 and 78 function to absorb shocks and vibration they are subjected to a minimum amount of wear as they do not come in contact with the road but roll upon the tracks 45 and 79. A feature of this embodiment of the invention is that the wheels 43 are driven by the wheels 35 so that the tractive effort of the vehicle is not transmitted through the pneumatic tires 44.

While the embodiment of the invention illustrated in Figs. 1 to 8, inclusive, is provided with slides 59, it will be readily understood that in some instances the slides 59 may be rigidly secured to the brackets 60 and that the increase or decrease in the horizontal distance between the pins 57 and 62, which takes place when the links 58 are being angularly displaced around the axes of the pins 62, may be compensated for by the springs 19. If desired, the pins 62 may project from the brackets 60, or the set screws 64 may be adjusted to prevent relative motion between the slides 59 and the brackets 60. It is advantageous to employ the links 58 as they co-operate with the knuckle pins 48 to limit relative motion between the axle 21 and the auxiliary axle 65 to a plane passing through the longitudinal axes of the axles.

Figure 9:
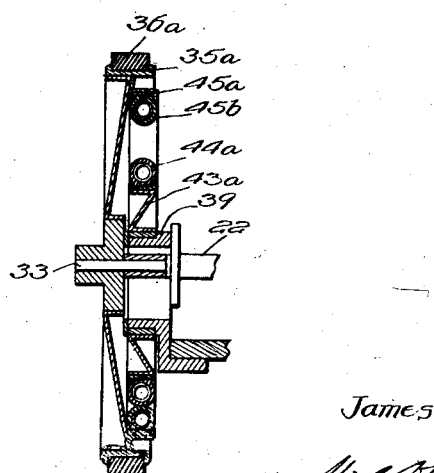
Fig. 9 is a fragmentary section corresponding to Fig. 7 and illustrating another form of the invention.

In Fig. 9 I have illustrated another form of the invention embodied in a wheel 35ª having a solid resilient tire 36ª and adapted to be mounted upon one of the aforementioned shafts 33 which are rotatably journaled in the rear axle 22. Carried by the wheel 35ª is an annular flange 45ª to which a pneumatic tire 45ᵇ is detachably secured, the tire 45ᵇ serving as a track for a pneumatic tire 44ª detachably secured to a wheel 43ª rotatably journaled upon one of the hubs 39. If desired, the wheels 35ª and 43ª may be used in place of the wheels 35 and 43. Obviously, that form of the invention which is illustrated in Fig. 9 may also be embodied in wheels adapted to replace the wheels 52 and 77.

Fig. 10 shows another form of the invention embodied in a wheel 35ᶜ adapted to be mounted on one of the aforementioned shafts 33. The wheel 35ᶜ is preferably formed with an annular metallic rim 35ᵈ upon which a solid resilient tire 35ᶠ may be detachably secured. The rim 35ᵈ serves as a track for a wheel 43ᶜ rotatably journaled on the associated hub 39, the wheel 43ᶜ being provided with a pneumatic tire 44ᶜ.

I have illustrated still another form of the invention in Fig. 11, the invention being embodied in a wheel 35ᵍ comprising a metallic rim 35ʰ upon which a solid resilient tire 36ᵍ is detachably secured. The rim 35ʰ serves as a track for a plurality of wheels 80 rotatably journaled upon pins 81 mounted in brackets 82 which are secured to the free ends of arcuate spring members 84, the other ends of the spring members 84 being rigidly secured to a hub 85 which may be rotatably journaled upon one of the aforementioned hubs 39. The wheel 35ᵍ is adapted to be mounted upon one of the shafts 33. It will be readily understood that the wheel 35ᵍ and the apparatus comprising the wheels 80, the arcuate spring members 84 and the hub 85 may be used in place of the wheels 35 and 43, if it is so desired.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A self-propelled vehicle comprising a frame, an auxiliary frame movably mounted on said first-mentioned frame, ground-engaging wheels movable with said auxiliary frame, means for driving said wheels, and wheels mounted on said first-mentioned frame and supported by said ground-engaging wheels.

2. A self-propelled vehicle comprising a frame, an auxiliary frame movably mounted on said first-mentioned frame, ground-engaging wheels movable with said auxiliary frame, means for driving said wheels, an axle, wheels carried by said axle and running on said first-mentioned wheels, and resilient means interposed between said axle and the first-mentioned frame.

3. A self-propelled vehicle comprising a frame, an auxiliary frame pivoted on said first-mentioned frame, ground-engaging wheels movable with said auxiliary frame, means for driving said wheels, and wheels mounted on said first-mentioned frame and supported by said ground-engaging wheels.

4. A self-propelled vehicle comprising a frame, an auxiliary frame pivoted on said first-mentioned frame, ground-engaging wheels movable with said auxiliary frame, means for driving said wheels, an axle, wheels carried by said axle and running on said first-mentioned wheels, and resilient means interposed between said axle and the first-mentioned frame.

5. In a vehicle, an axle, steering knuckles pivoted to the end of said axle, ground-engaging wheels rotatably journaled upon said steering knuckles, a second axle having its ends pivotally connected with the steering knuckles, a hub at each end of the second axle pivoted to said steering knuckles, and wheels rotatably journaled upon said hub and supported by said first-mentioned wheels.

6. A vehicle comprising a frame, an axle, mechanism holding said axle and pivotally secured to said frame, steering knuckles pivoted to the ends of said axle, ground-engaging wheels rotatably journaled upon said steering knuckles, a second axle having its ends pivotally connected to the steering knuckles, a hub at each end of the second axle pivoted to said steering knuckles, and wheels rotatably journaled upon said hub and supported by said ground-engaging wheels.

7. A vehicle comprising a frame, an axle, mechanism holding said axle and movably mounted relative to said frame, steering knuckles mounted upon the ends of said axle, ground-engaging wheels rotatably journaled upon said steering knuckles, a second axle having its ends pivotally connected to the steering knuckles, resilient means interposed between said second axle and said frame, a hub at each end of the second axle pivoted to said steering knuckles, and wheels rotatably journaled upon said hub and supported by said ground-engaging wheels.

8. A vehicle comprising a frame, a front axle, means for movably securing said front axle to the frame, a pair of steering knuckles mounted upon the ends of said front axle, a pair of wheels rotatably journaled upon said steering knuckles, a rear axle, means for movably securing said rear axle to the frame, shafting rotatably journaled in said rear axle, a second pair of wheels secured to said shafting, an auxiliary front axle secured to the frame and having its ends pivotally connected to the steering knuckles, a hub at each end of the auxiliary front axle and pivotally connected to said steering knuckles, a third pair of wheels rotatably journaled upon said hub and supported by said first-mentioned wheels, an auxiliary rear axle secured to the frame, and a fourth pair of wheels rotatably journaled upon said auxiliary rear axle and supported by said second pair of wheels.

9. A vehicle comprising a frame, a front axle, means for movably securing said front axle to the frame, a pair of steering knuckles mounted upon the ends of said front axle, a pair of wheels rotatably journaled upon said steering knuckles, a rear axle, means for movably securing said rear axle to the frame, shafting rotatably journaled in said rear axle, a second pair of wheels secured to said shafting, an auxiliary front axle secured to the frame and having its ends pivotally connected to the steering knuckles, a hub at each end of the auxiliary front axle pivotally connected to said steering knuckles, a third pair of wheels rotatably journaled upon said hub and supported by said first-mentioned wheels, an auxiliary rear axle secured to the frame, a fourth pair of wheels rotatably journaled upon said auxiliary rear axle and supported by said second pair of wheels, and means for driving said shafting.

10. A vehicle comprising a frame, an auxiliary frame movably mounted on said first-mentioned frame, ground-engaging wheels movable with said auxiliary frame, pneumatic tires on said ground-engaging wheels spaced from the periphery thereof, and wheels mounted on said first-mentioned frame adapted to ride upon said pneumatic tires.

11. A vehicle comprising a frame, an auxiliary frame movably mounted on said first-mentioned frame, ground-engaging wheels movable with said auxiliary frame, pneumatic tires mounted on said ground-engaging wheels and spaced from the peripheries thereof, wheels mounted on said first-mentioned frame, and pneumatic tires mounted on said last-mentioned wheels and adapted to ride upon said first-mentioned tires.

In testimony whereof, I have hereunto signed my name.

JAMES T. SHOUP.